United States Patent [19]
Zimmermann

[11] Patent Number: 5,471,190
[45] Date of Patent: Nov. 28, 1995

[54] METHOD AND APPARATUS FOR RESOURCE ALLOCATION IN A COMMUNICATION NETWORK SYSTEM

[75] Inventor: Philip R. Zimmermann, Boulder, Colo.

[73] Assignee: Timothy D. Schoechle, Boulder, Colo.

[21] Appl. No.: 868,684

[22] Filed: Apr. 15, 1992

Related U.S. Application Data

[63] Continuation of Ser. No. 596,217, Oct. 12, 1990, abandoned, which is a continuation of Ser. No. 468,836, Jan. 19, 1990, abandoned, which is a continuation of Ser. No. 382,262, Jul. 20, 1989, abandoned.

[51] Int. Cl.⁶ ................................................. H04B 3/00
[52] U.S. Cl. ...................... 340/310.01; 340/310.06; 340/310.08; 340/538
[58] Field of Search .................... 340/310 R, 310 CP, 340/310 A, 531, 538, 310.01, 310.06, 310.08

[56] References Cited

U.S. PATENT DOCUMENTS

| | | | |
|---|---|---|---|
| 4,644,320 | 2/1987 | Carr et al. | 340/310 A |
| 4,649,323 | 3/1987 | Pearlman et al. | 315/307 |
| 4,703,306 | 10/1987 | Barritt | 340/310 CP |
| 4,731,810 | 3/1988 | Watkins | 340/531 |
| 4,755,792 | 7/1988 | Pezzolo et al. | 340/310 CP |
| 4,773,138 | 9/1988 | Ballato et al. | 310/313 D |
| 4,792,731 | 12/1988 | Pearlman et al. | 315/316 |
| 4,804,938 | 2/1989 | Rouse et al. | 340/310 R |
| 4,835,517 | 5/1989 | Van der Gracht et al. | 340/310 R |
| 4,951,029 | 8/1990 | Severson | 340/533 |

OTHER PUBLICATIONS

"Hooking into Applebus" reprint from Systems & Software, Jul., 1984.

*Primary Examiner*—Donnie L. Crosland
*Attorney, Agent, or Firm*—Shoemaker and Mattare, Ltd.

[57] ABSTRACT

A control communication network system adapted for distributed control and communication between various home electrical appliances in a manner that eliminates the need for a central controller and eliminates or greatly simplifies the manual assignment of addresses, control relationships or other network resources. The system utilizes a novel and useful process of "hailing" for addresses or resources by newly introduced network devices combined with a process by which declaratory statements are used to convey identification or resource availability information to potential controlling devices. The present invention comprises an intelligent lightswitch which can be dynamically "taught" to control or to be controlled by any other similar lightswitch in a given house without special wiring or user intervention other than the toggling of a simple "teach/learn" switch associated with each lightswitch.

13 Claims, 11 Drawing Sheets

METHOD AND APPARATUS FOR RESOURCE ALLOCATION IN A COMMUNICATION NETWORK SYSTEM

This application is a continuation of prior application Ser. No. 596,217 filed Oct. 12, 1990, now abandoned, which was a continuation of Ser. No. 468,836 filed Jan. 19, 1990, abandoned, which was a continuation of Ser. No. 382,262 filed Jul. 20, 1989, abandoned.

FIELD OF THE INVENTION

This invention relates generally to home automation systems, and more particularly, to a home automation system using "smart" switches having a "teach/learn" function so that they can be dynamically taught to control or to be controlled by any other similar switch in the house.

DESCRIPTION OF THE PRIOR ART

Within the current development of a variety of home automation systems and products there has been a growing interest in communication networks to facilitate the interconnection of lights, appliances, sensors, control devices, etc., for purposes of remote sensing and control.

One such system, known as "Homenet", has been partially developed by the General Electric Company of Schenectady, N.Y., and has been proposed as the basis for an industry standard known as "CEBus" (Consumer Electronic Bus) by the EIA (Electronic Industries Association).

Another such communication system currently in widespread use is known as the "X-10" system manufactured by X-10 USA, Ltd., of Montvale, N.J., which utilizes a signalling means whereby simple control signals (i.e., on, off, dim, brighten, etc.) are transmitted over pre-existing power wires in the home for remotely controlling power to lights, appliances and the like.

Although extremely useful and quite popular, the X-10 system suffers from certain limitations that inhibit its application to more extensive home automation or control functions. Namely: 1) its slow data rate of approximately 120 bits per second; 2) its dependence for timing and synchronization on the AC powerline 60 Hz. zero crossing; 3) its essentially one-way communication protocol; 4) its sensitivity to electrical noise, causing both lost messages and false interpretation and spurious activation; and 5) its dependence on the user manually setting specific digital codes on electro-mechanical switches to establish the proper addressing of messages. The CEBus system and its protocol seek to establish a newer, more advanced standard system to remedy these and other limitations and to enable a broader range of remote sensing, control and communication for future application in all manner of electrical and electronic devices.

The Consumer Electronic Bus (CEBus) protocol is a low cost, low speed (1000 bits per second) local area network that uses a power line carrier to send control information over typical house electrical power wiring. Such communication is useful for turning appliances and lights on and off remotely, as well as sending more sophisticated command message packets for other consumer electronics applications. CEBus is a Carrier Sense Multiple Access with Contention Resolution and Collision Detection (CSMA-CRCD) protocol, and transmits symbols using a pulse-width encoding, non-return to zero scheme. CEBus protocol is derived from the "Homenet" protocol developed at General Electric in 1983, and is currently being incorporated into a standard by the Electronic Industries Association (EIA). CEBus protocol transmits data packets with check-sum error detection, and retransmits unacknowledged packets. CEBus is therefore more versatile than X10, and there is a much better chance of messages getting through without error, e.g., without being falsely triggered by line noise.

X10 modules are uniquely addressed via a house code and a unit code. All X10 modules in the same house share the same numeric house code, which must be different from a neighbor's house code so that signals developed in a first house do not control the lights and appliances in a neighboring house. Each X10 module in a house must have a unique numeric unit code, so that the user can uniquely select which X10 module he desires to address. The house and unit address codes are mechanically selected with small rotary switches or thumbwheel switches on the X10 module. When an additional new X10 module is purchased, its house code and unit code switches must be set to meet these addressing requirements. There is no parallel to this inconvenient requirement in any other common household object.

Other prior art devices are shown in U.S. Pat. Nos. 4,649,323, 4,733,138 and 4,792,731. U.S. Pat. No. 4,649,323 describes a microcomputer controlled light switch for initiating various control modes for a light source, such as dimming of a light. U.S. Pat. No. 4,733,138 describes a programmable lighting circuit controller for controlling a plurality of household lighting circuits, and includes a "learn" function. U.S. Pat. No. 4,792,731 also describes a control system for multi-room lighting, in which an assignment panel is associated with the multi-room controller to link several individual light controls in a group under the control of a selected individual control within the group. All linked controls mimic the last activated control.

SUMMARY OF THE INVENTION

It is therefore an object of the present invention to provide an apparatus and method for advanced protocol and "language" that will enable the CEBus to provide not only full two-way communication, but that will also allow automatic network addressing configuration (a "plug'n play" simplified user interface) avoiding the use of mechanical switches previously required.

It is a further object to provide to the CEBus network certain novel semantic mechanisms to enable a certain degree of "distributed intelligence" throughout the network including not only address allocation but also the establishment of control relationships between independent appliances as well as other useful resource allocation functions.

Another object is to utilize such distributed intelligence to enable the CEBus to change the architecture of the traditional remote control network from one based on a central controller (i.e., hub and spoke system or master and slave system) to a system composed of a plurality of intelligent decision-making "peer" nodes and not requiring any central controller.

Yet another object of the present invention is to avoid the limitations imposed by the use of mechanical switches for setting address codes.

These objects are achieved by a control means coupled between function initiating means and media signal transmission means. The control means includes a receiving modem coupled to decoding means and decision processing means which respectively receive intelligence from said signal transmission means, decodes such intelligence and controls the function initiating means in a preselected changeable manner. User interface means are also provided for independently initiating function and for preselecting communication and control mode functionality of the system.

BRIEF DESCRIPTION OF THE DRAWINGS

The foregoing as well as other objects and advantages of the invention will become more apparent from the following detailed description taken in conjunction with the accompanying drawings, wherein like reference characters designate like parts throughout the several views, and wherein.

DETAILED DESCRIPTION OF THE PREFERRED EMBODIMENTS

The communication and control system of the present invention can be briefly described as a system of simple communicating devices utilizing microprocessors and other integrated circuits and certain communication language protocol processor (in software algorithms) to exchange messages and information to facilitate remote sensing and control functions in a manner not requiring a single central control point.

If a user has installed the invention in place of conventional light switches, he can reassign them to control each other instead of just controlling themselves. This mechanism for remapping the control relationships between his light switches and wall outlets can, for example, make the lightswitch in his bedroom control all the downstairs lights. The user can accomplish this feat without any rewiring of his house.

A conventional "dumb" lightswitch can control a specific conventional ceiling light fixture, or it can control a specific conventional wall outlet. Such is the way a house is conventionally permanently wired. With the present invention, any lightswitch in the house incorporating the features of the invention can be made to control any other lightswitch or outlet in the house, or any group of lightswitches or outlets incorporating the features of the invention. A particular outlet or lightswitch or group of outlets or lightswitches of the invention may be controllable from more than one location and without any rewiring.

If a conventional "dumb" lightswitch already controls a conventional wall outlet, a user can control that same outlet by replacing its controlling "dumb" lightswitch with a lightswitch incorporating the invention because a lightswitch according to the invention can act functionally identical to a "dumb" conventional lightswitch. Since the lightswitch of the invention can also be controlled remotely from another lightswitch incorporating the features of the invention, the "dumb" outlet wired to it is also remotely controlled. This means in this case that there would be no need to purchase an outlet incorporating the invention to replace the "dumb" outlet. However, if a user wants to control another "dumb" outlet that is not wired to any wall lightswitch, he need simply replace this outlet with an outlet incorporating the invention therein, and then he can control it from any lightswitch in the house incorporating the invention, again without rewiring.

Finally, outlets and lightswitches according to the invention may also be turned on and off from centralized home automation system hubs. This is useful for automated energy management, home security, and home control through remote dial-in telephone access. Also, the technology of the present invention can serve for remote sensors for such hubs, to detect the opening of doors or windows, windows breaking, or temperature changes.

Figure 1:
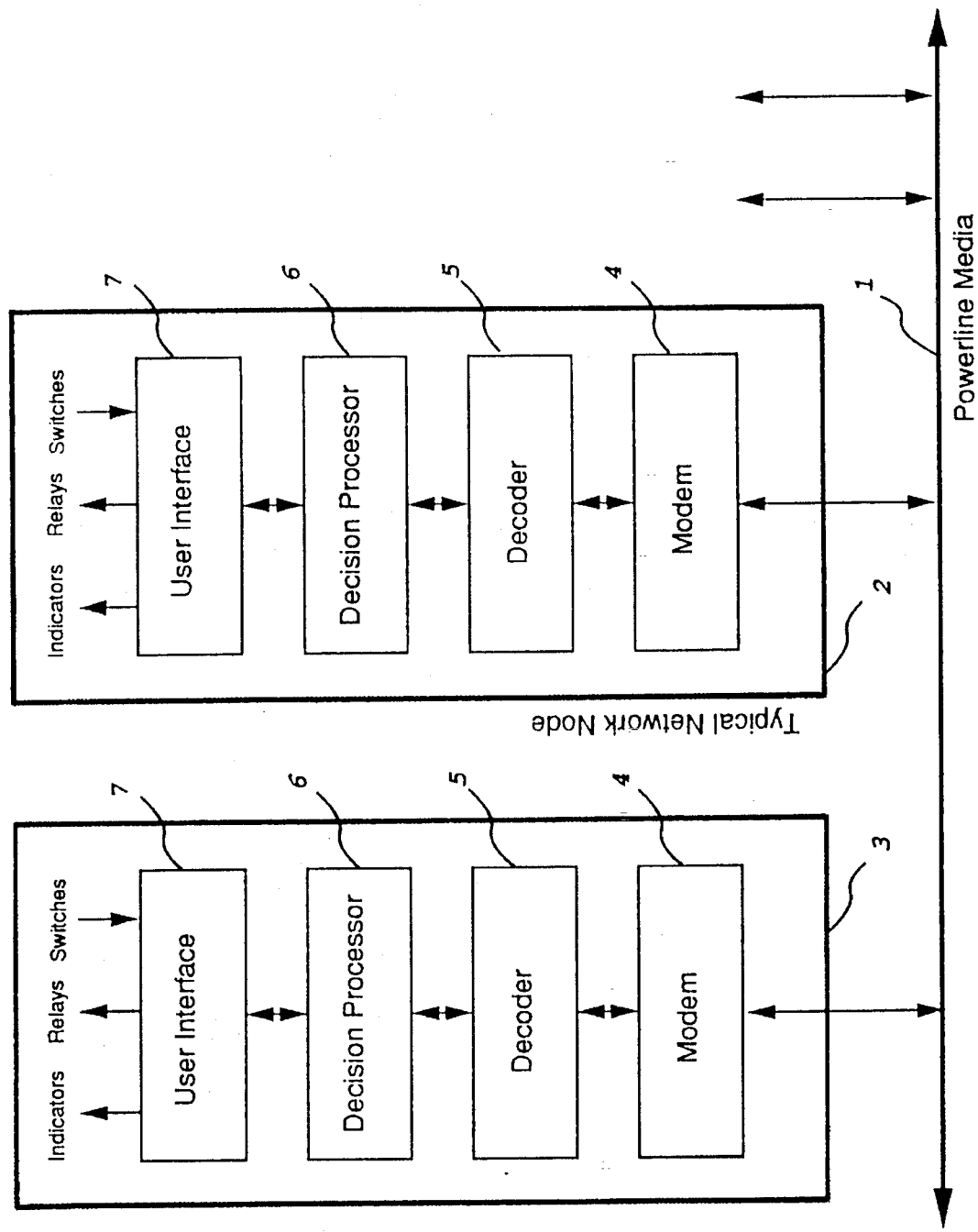
FIG. 1 is a block diagram of one example of the basic system of the invention.

Referring to FIG. 1, the basic system of the invention is comprised of a media signal transmission means 1 for carrying messages between network nodes 2 and 3. The transmission means may comprise a powerline media (hard wire) as shown, or it may comprise radio waves, infra red, fiber optics or other known energy sources. Within each of said network nodes is provided a modem or modulator/demodulator signal processing means (physical layer) 4 for connecting media signals to/from electrical signals in a predetermined manner; a decoder means 5 for converting said electrical signals to/from specific message symbols and messages; a decision processor means 6 for processing said messages to translate or interpret meaning; and user-interface means 7 for presenting said meaning to/from some user or user process.

In a preferred embodiment of the present invention, the control and communication system of the present invention can be briefly described as a "smart lightswitch" network node, which can control or be controlled by any other similar device connected to the same media (powerline) and can be employed for the purpose of remotely controlling electrical lights, fixtures, appliances or any sensor/actuator pair in the home, office building, automobile, airplane, ship or the like. The basic system of the preferred embodiment of the present invention is comprised of a pre-existing AC or DC powerline wiring signal transmission means for carrying signals anywhere on the premises; an ASK (amplitude shift keyed) 120 KHz carrier signal providing means for converting bursts of carrier signal into/from symbols; a microprocessor software decoder means for converting symbols into valid messages; a microprocessor software decision means for attributing such messages with meaningful information; and a toggle or momentary contact switch user interface means to allow convenient user interaction.

Figure 2:
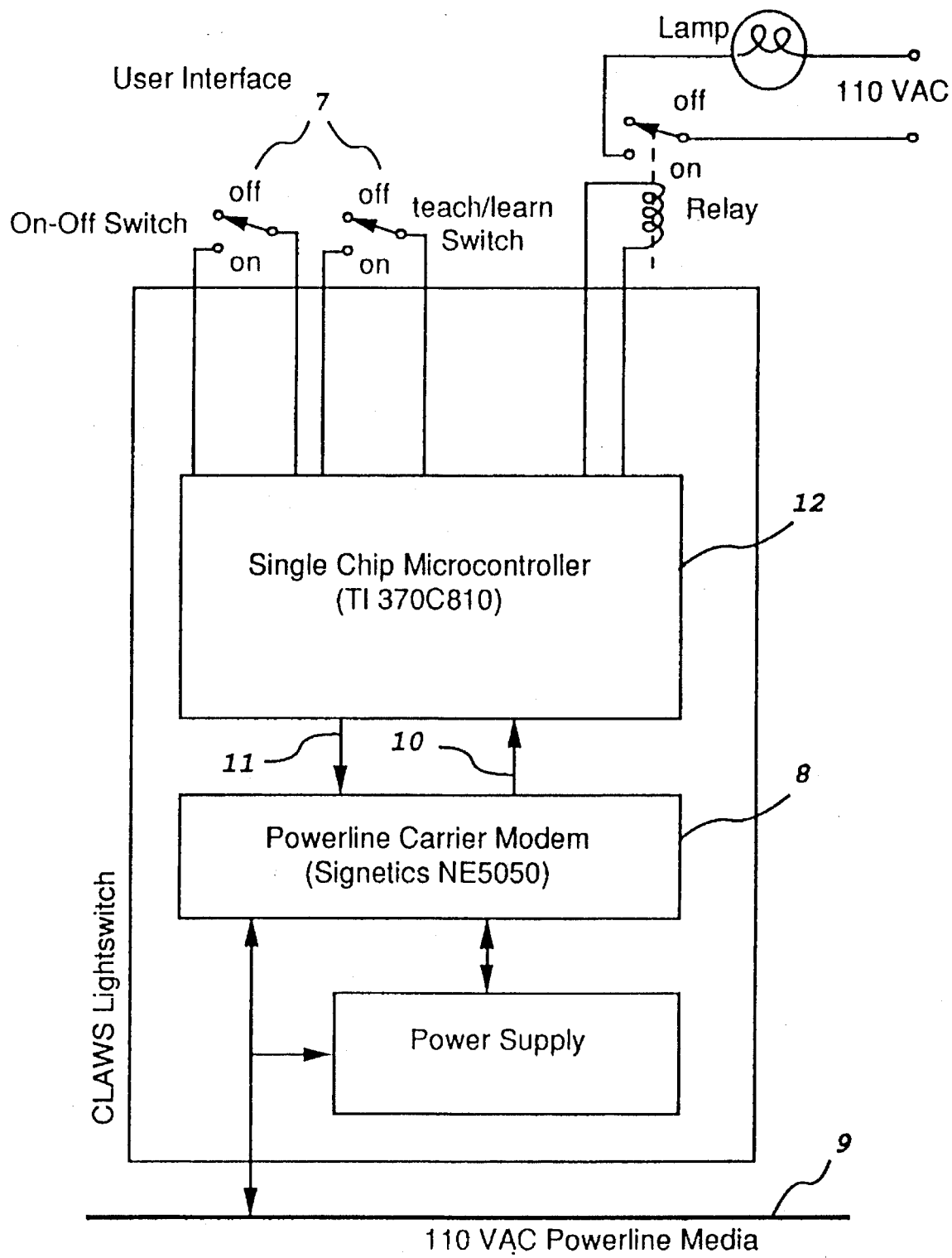
FIG. 2 is a block diagram of a preferred embodiment of one of the modules used in the system of the invention.

Referring to FIG. 2, which shows a block diagram of the preferred embodiment, a variety of devices can be employed for each of the elements in the control means, but typical ones are further described hereinafter. However, any device capable of performing the function described may be employed.

The signal processing means shown in FIG. 2 can be a Signetics NE5050 powerline modem integrated circuit 8. Such a device receives ASK signals imposed on a typical 110 VAC powerline 9 and converts them into a logic signal 10 signifying the instantaneous superior or inferior state of the communication channel (i.e., either carrier on or carrier off). The same device also transmits ASK signals by converting a logic high or logic low state 11 into a superior or inferior state signal imposed on the powerline.

The decoder means 5 and decision processor 6 shown in FIG. 2 can be a Texas Instruments TMS370C810 single ship microcontroller 12 which, through certain software algorithms, encodes or decodes the logic high or low state to/from a set of four symbols (i.e., one, zero, end of field, end of message). The decision processor 6, through certain software processes, interprets or encodes meaning to/from the mentioned symbols and composes meaningful messages or message packets and manipulates the user interface. The message packets composed by the decision processor can include both specific command message packets (e.g, to turn on or off a lamp) as well as network management message packets (e.g., to allocate a network address or resource, to declare a network address or resource, etc.). The above functions are accomplished by conventional programming techniques.

Figure 10:
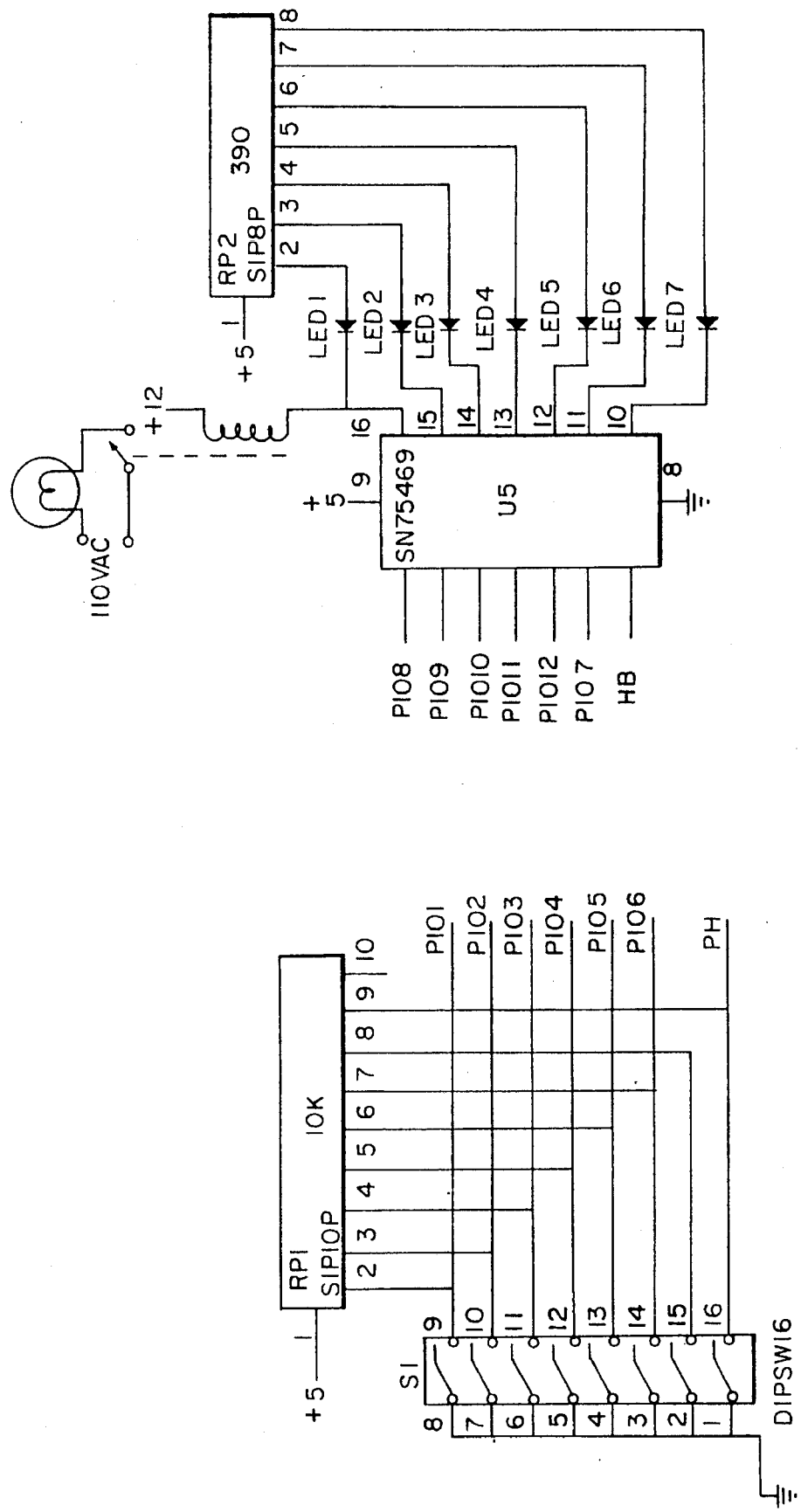
FIG. 10 is a schematic circuit diagram of the input/output connections used in the control means of the invention.
Figures 10A, 10B:
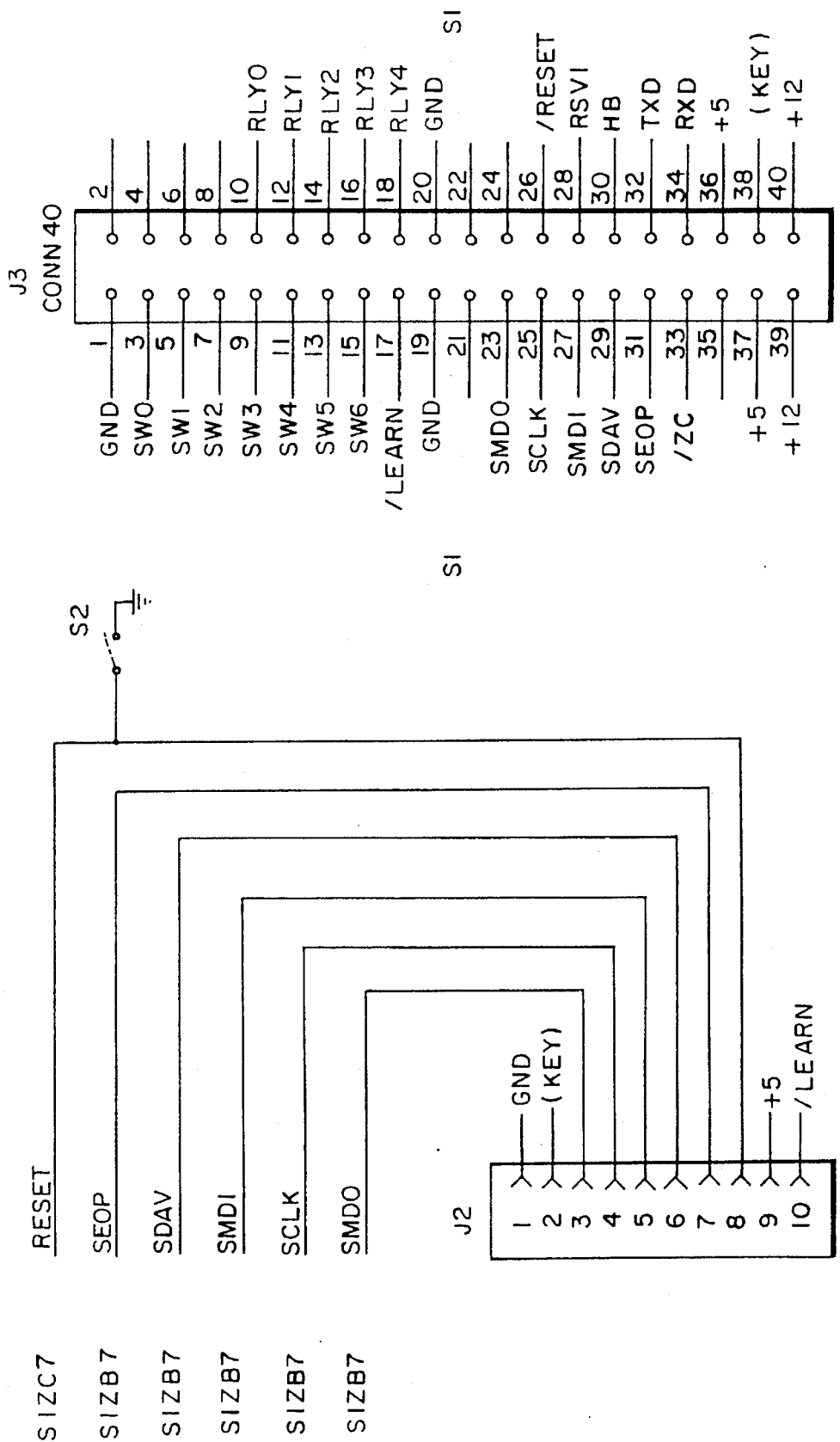
Figure 11:
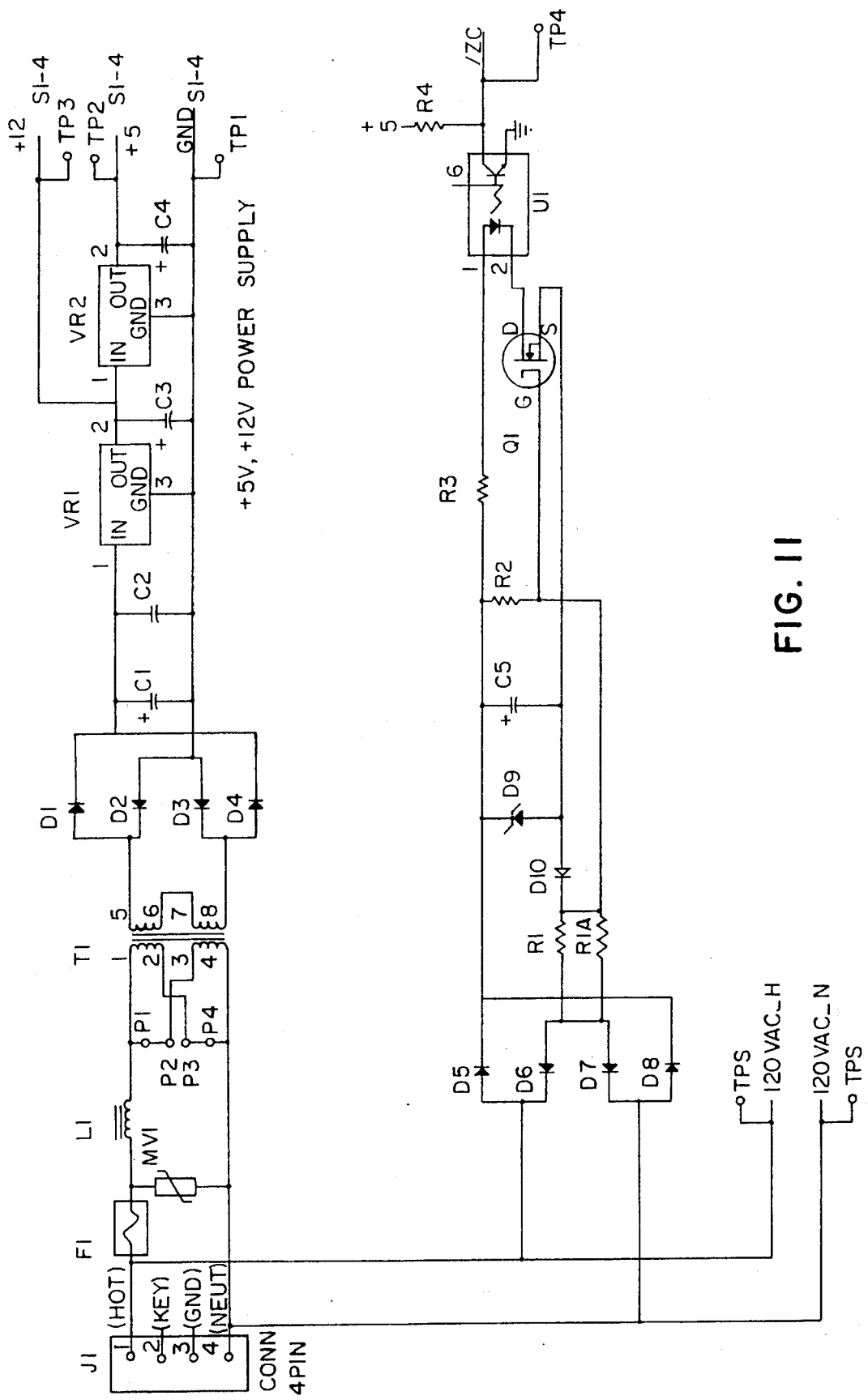
FIG. 11 is a schematic circuit diagram of the power supply.

The user interface means 7 depicted in FIG. 2 can be one or more toggle switches or pushbuttons such as are typically employed in wall or appliance switches, one or more relays to control a lamp or other appliance, and could also include one or more LED or other visual indicators to reflect the current state of the switch or device under its control (see FIG. 10, for example).

Referring to the schematic diagram, the user interface of the present invention is controlled by parallel input/output ports (a) such as are commonly employed in microcontrollers, although other input/output methods could be used (e.g., Serial Peripheral interface). In the system of the present invention, the closure of the on/off switch (b) or the teach/learn switch (c) is sensed by the microcontroller as a logic signal and interpreted by the software algorithms in the microcontroller to cause certain predetermined actions. Such actions could include activation of an output logic signal (d) to activate a relay (e) to turn on a lamp (f) or initiation of a message packet to turn on some other remote lamp or to cause other network functions as will be described later.

The system of the invention is an intelligent CEBus based replacement for conventional light switches and wall power outlets. It allows remote control of lighting and home appliances. It has some similarities to an existing remote control technology currently in wide use, the X10 system discussed previously herein. However, the invention provides a mechanism for "remapping" the control relationships between light switches and wall outlets, without rewiring the house, and enables the switches and outlets to communicate with one another when properly enabled.

Modules incorporating the invention can be provided in at least three forms: a wall mounted lightswitch; a wall mounted power outlet; and a detachable plug-in power module similar to an X10 plug-in appliance or lamp module. The main difference between the lightswitch of the invention and the outlet and plug-in modules of the invention is that the invention lightswitch has an on/off switch on it, and the others do not. The lightswitch of the invention can both send and receive on/off commands, while the wall outlet and plug-in modules of the invention can only receive on/off commands. Both, however, can transmit identifying data.

Establishing Addresses With the Teach/Learn Switch of the Invention

Figure 3:
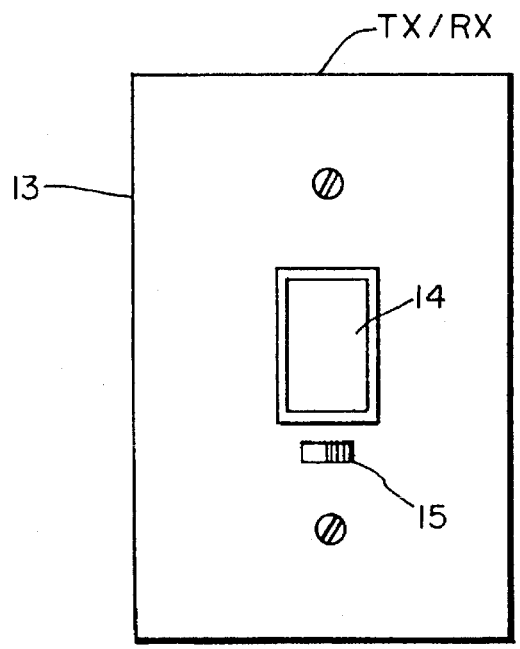
FIG. 3 is a front view of a lightswitch having an interface panel according to the invention.
Figure 4:
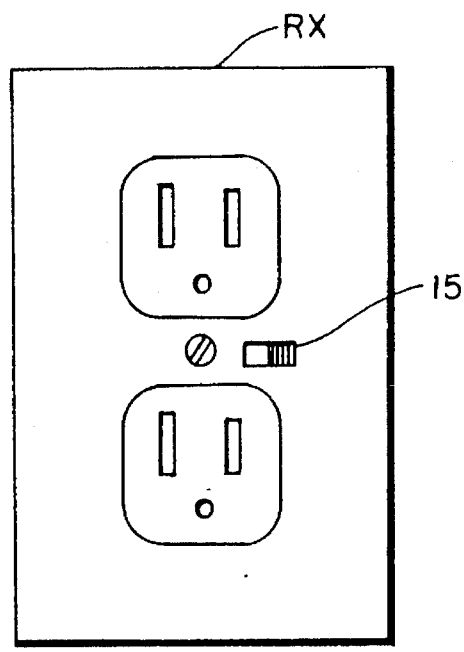
FIG. 4 is a front view of a wall outlet having an interface panel according to the invention.

Referring to FIGS. 3 and 4, a major novel and useful feature of the invention is its simple intuitive user interface.

The lightswitch 13 of the invention has a standard on/off toggle switch or momentary contact pushbutton 14, like any conventional "dumb" lightswitch; but it also has a special recessed "learn/teach" toggle switch 15. The system of the invention has no conventional house code or unit code switches. It thinks up house and unit code addresses with minimal help from human users. When a user installs the first lightswitch module of the invention and first applies power to it, it behaves exactly like the "dumb" lightswitch it replaces. It does not hear any incoming CEBus messages, and it does not transmit any.

Figure 5:
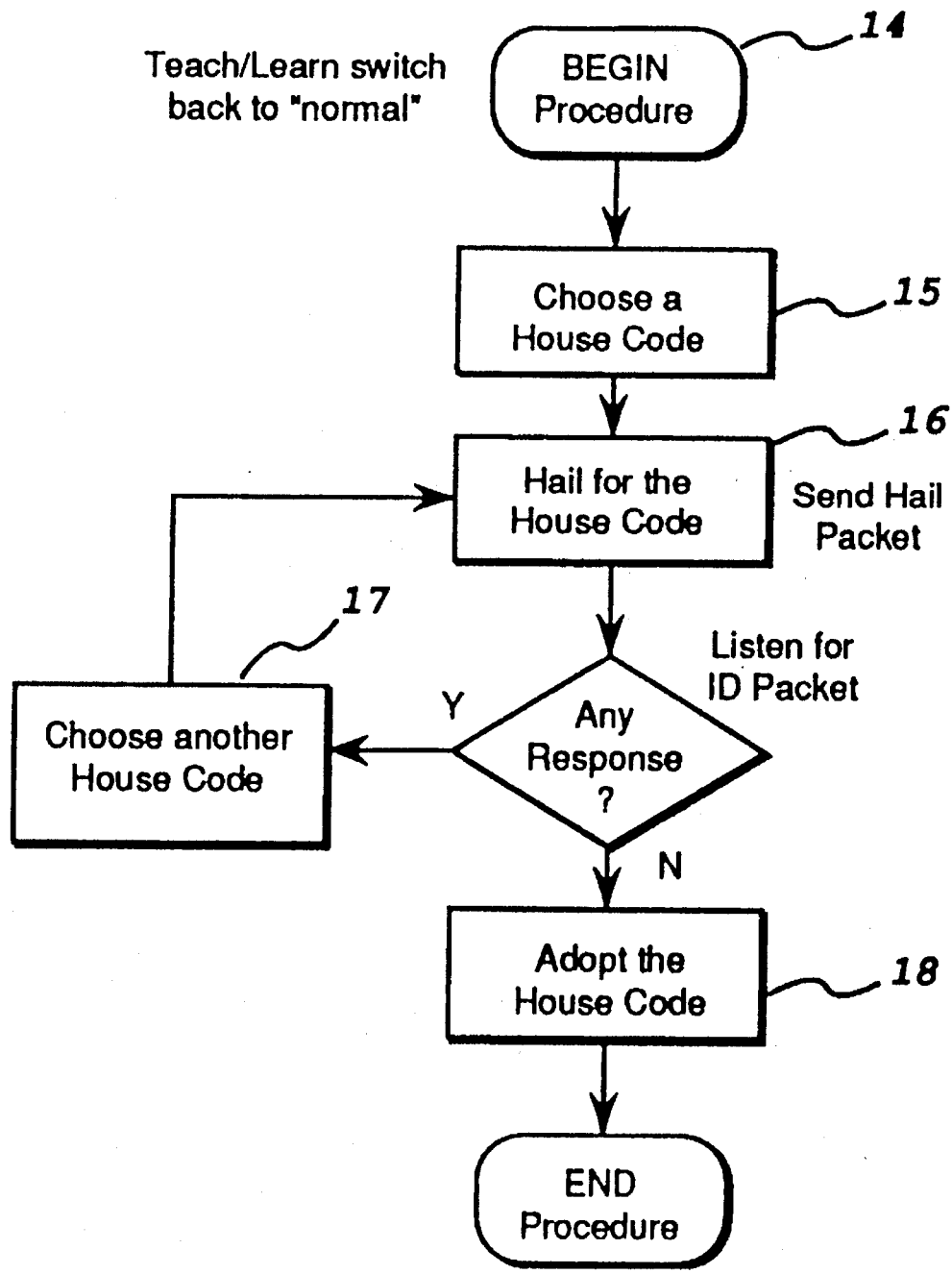
FIGS. 5–7 are flow charts depicting the address and resource allocation processes.
Figure 6:
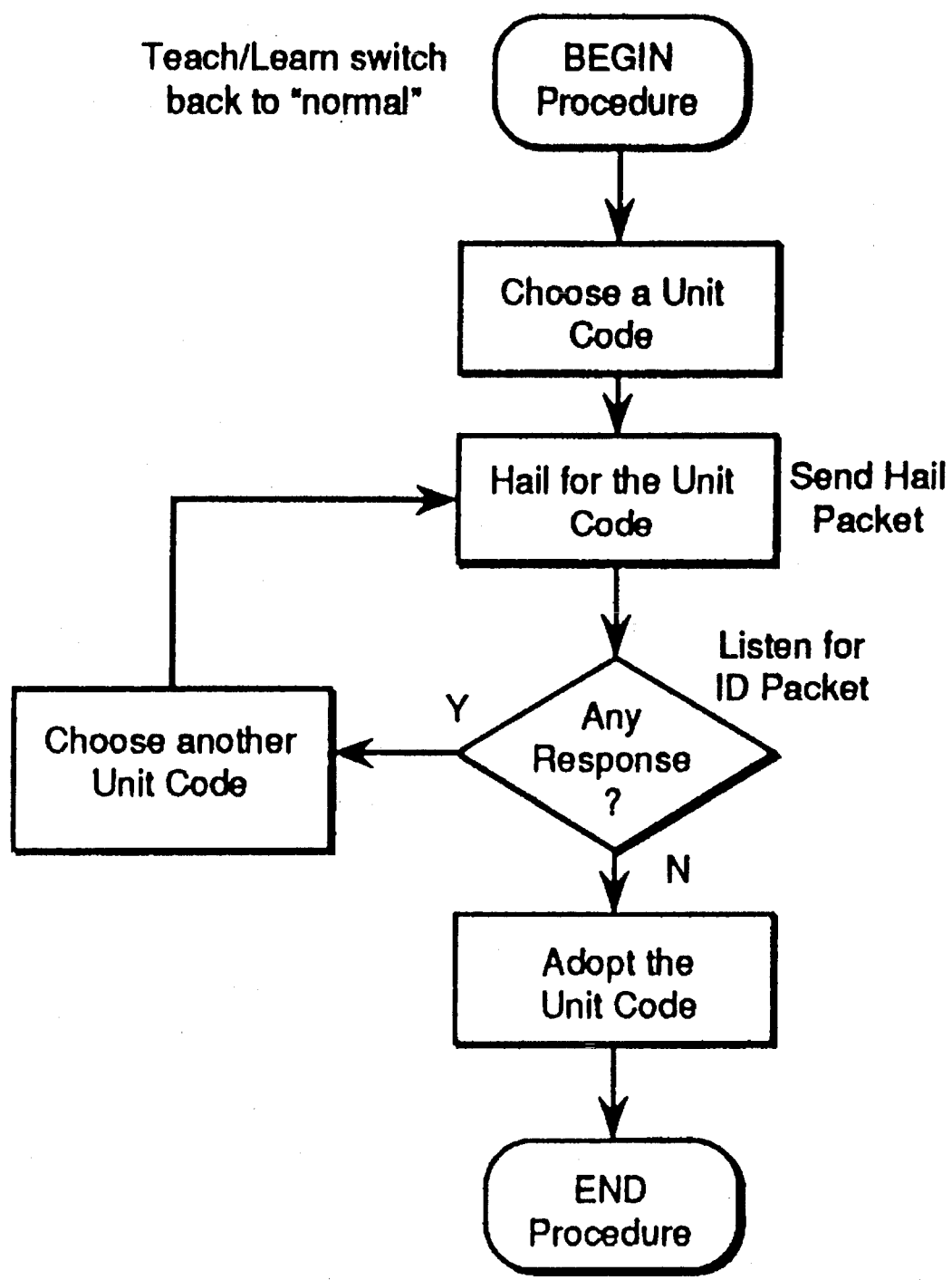
Figure 7:
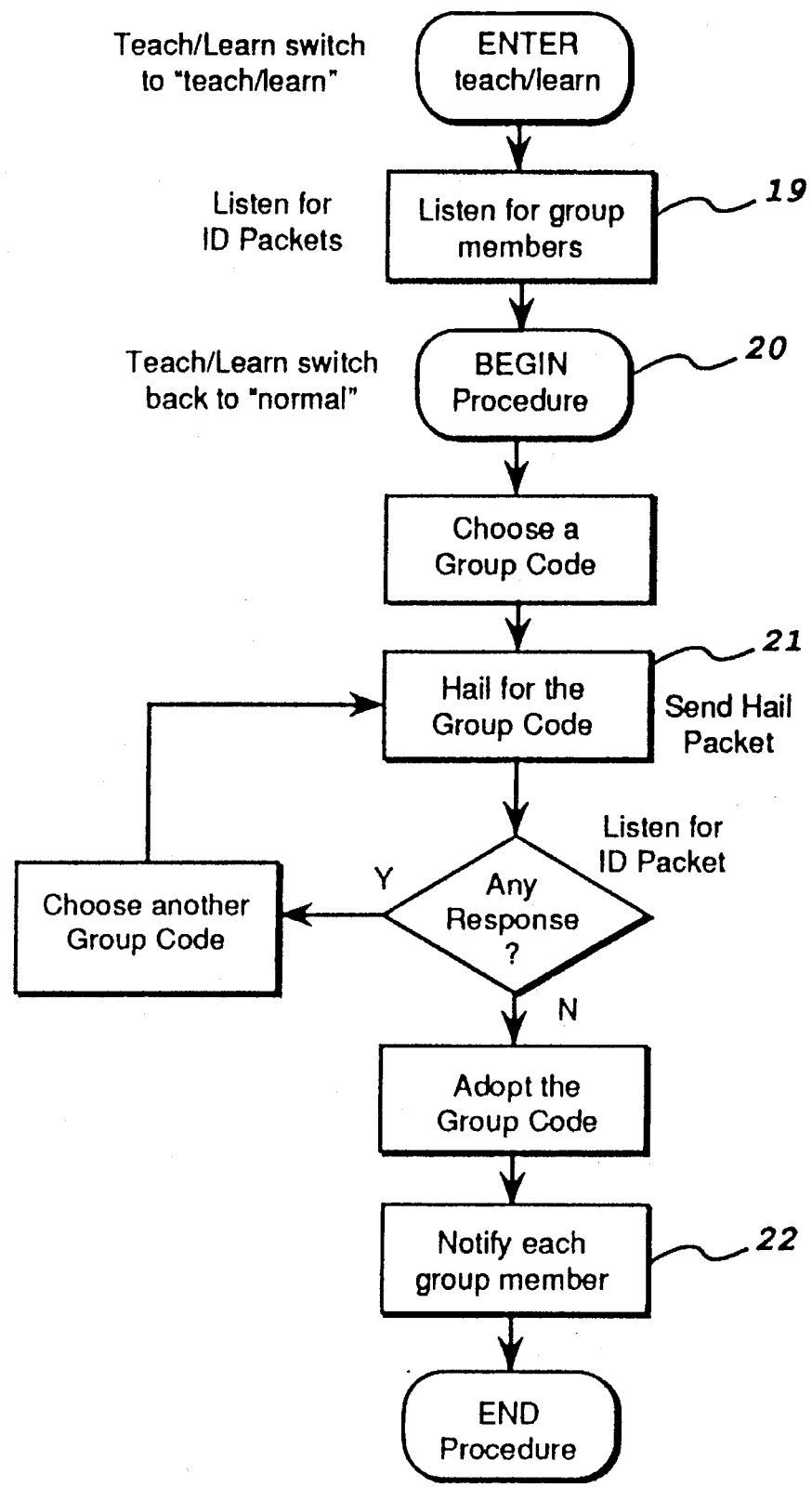
Figure 8:
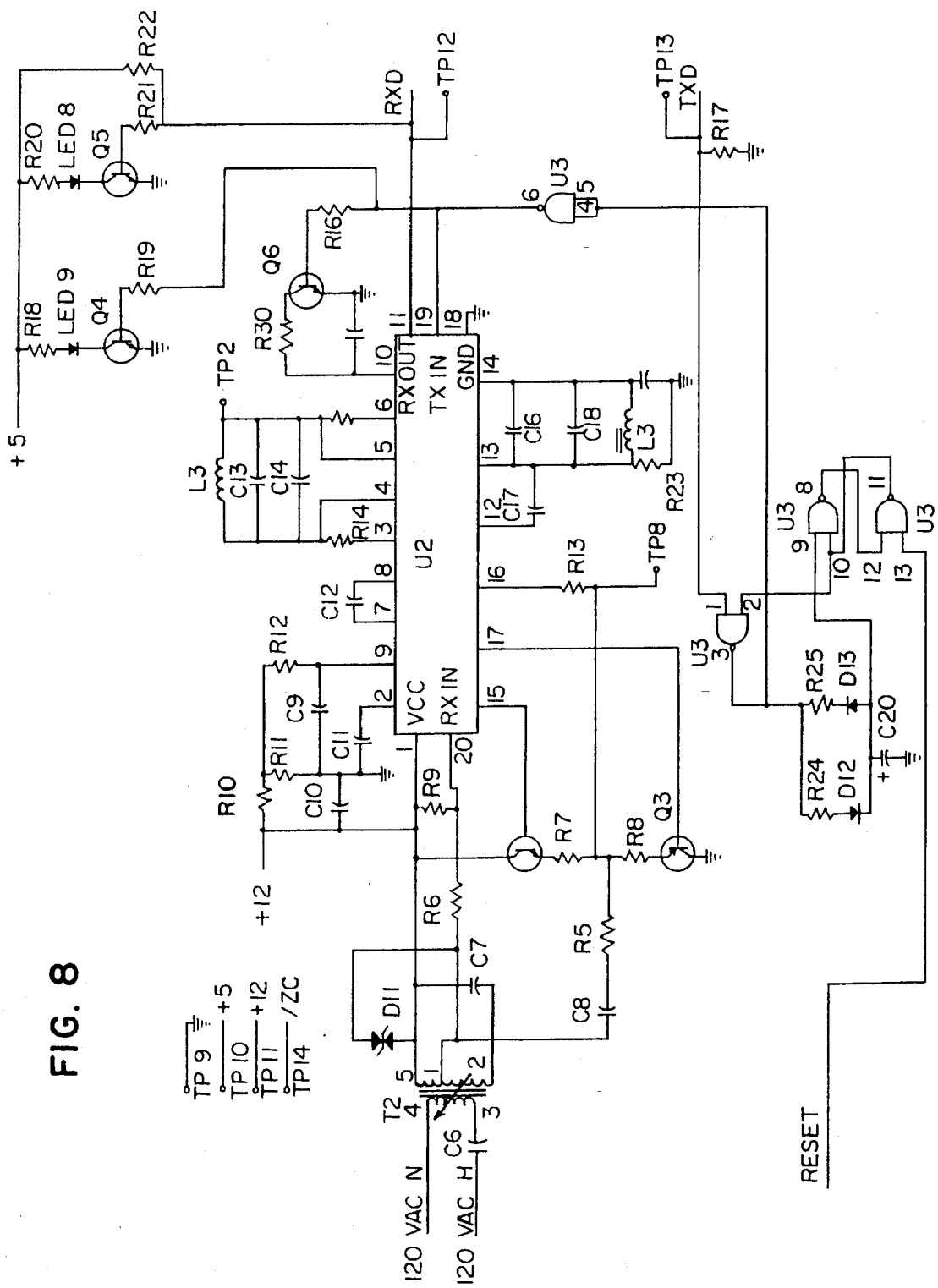
FIG. 8 is a schematic circuit diagram of the modem used in the control means of the invention.
Figure 9:
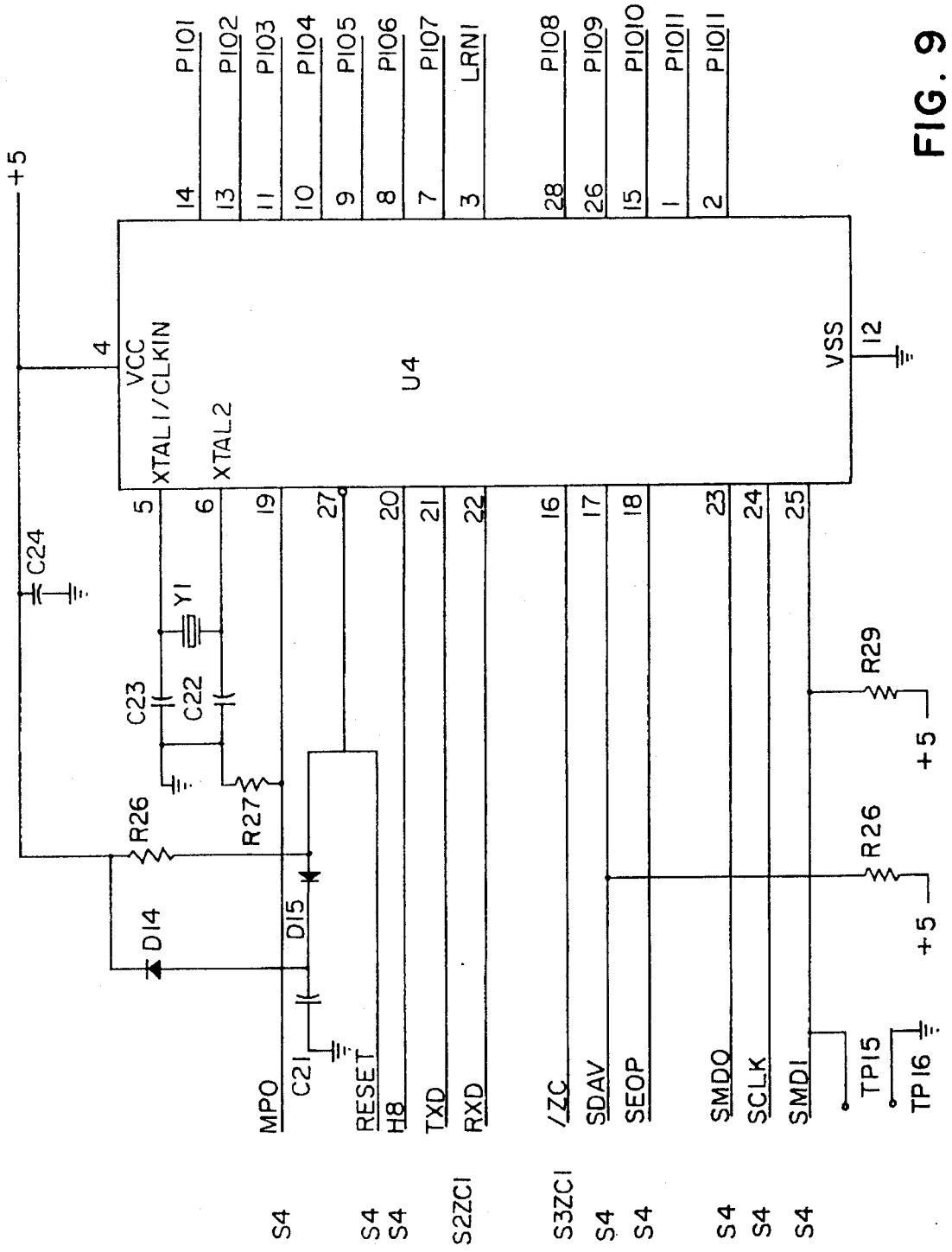
FIG. 9 is a schematic circuit diagram of the microprocessor pin connectors in the control means of the invention.

Referring to FIGS. 5–7, the teach/learn switch is employed in the following process. The first thing the user need do to get on the air with CEBus is to establish a house code and a unit code.

Step 1: The module of the invention is put in teach/learn mode by turning on the teach/learn toggle switch. It does not learn about any other invention modules at this time because there are not any others to teach it.

Step 2: The teach/learn mode is then switched off. When the modules comes out of teach/learn mode 16, the microprocessor is functional via its program to determine that that module has no house code or unit code. Consequently, the microprocessor makes up its own code 17. First, it transmits the house code 17, referred to as hailing 18, seeking a response and waits a predetermined interval for a response. If it hears a response, a neighboring building is already using the house code 17 and it cannot adopt this house code, since each house must use a different house code 17. It then hails for a house code 19 and listens for a response. It keeps this up with different house codes until no one answers. Then it can adopt that house code 20 as its own, since no one else is using it.

Now that it has its own house code, it must assign a unit code to itself. Of course this unit code is unique in the user's house, since this module knows it is the very first module to use this house code.

If a second module is now installed in the house, it is not necessary to find another unique house code, since all the units in that house share the same house code. It is therefore not necessary to hail a new house code. The second and subsequent modules will be taught to use the same house code that the first module selected. This process is called pollination. Right after applying power to the new "student" module, the user must not toggle its teach/learn switch on and off as he did with the first one. Instead, he must do the following:

Step 1: The second "student" module is put in teach/learn mode.

Step 2: The learn/teach switch on the first module is toggled on and then off. Upon leaving the teach/learn mode, the first module will send out an identification message in the usual way to teach any other module that is in the teach/learn mode. The student module will hear it, and since it does not yet have a house code of its own, it will adopt the house code in the identification message it receives. It will not hail for a new house code, because it has already been taught one.

Step 3: The second module is then toggled out of the teach/learn mode. This second module has now been pollinated with the same house code as the first module. It now has to come up with its own unique unit code that no other module in that house is using. To do this, it hails for an unused unit code, in a manner exactly analogous to the way the first module hailed for an unused house code.

Note that the preceding teaching ritual with the second module did not teach it to control the first module. The first time the user put it in the teach/learn mode, it learns its house code, and nothing else. Subsequently, he can perform the usual teaching ritual for establishing remote control relationships. The first pollination cycle teaches a new module its house code, and nothing else. The second and subsequent pollination cycles will teach it who to control.

If a module receives ID message packets from more than one house code while in its initial configuration teach/learn state, it does not inherit a house code from them. In that case, the module ignores all ID packets and does a cold reset. This prevents a neighbor from accidentally contaminating the user's initialization of a new module.

Installing additional modules is just like installing the second module. Any module that has been taught its house code can teach that house code to any mew modules. This ensures that every module in that house has a unique unit code, and that they all share the same house code, which is different from all neighboring house codes. The user need never know what these codes are. They are kept in non-volatile memory, immune from loss through power failures.

It is possible to restore a module to its initial, pure "dumb" state. This is useful if it is accidentally allowed to generate its own unique house code instead of being taught the house code from another module; or if the user just wants it to go back to acting like a "dumb" lightswitch. To accomplish this, it is only necessary to cycle the power (or induce reset somehow) while the teach/learn switch is set to the teach/learn position. This procedure will force a cold reset that will destroy any non-volatile state information.

If any of the units are placed in circuit (connected to a powerline) while the teach/learn switch is set to the teach/learn position, that unit will not enter teach/learn mode until the teach/learn switch is toggled once off and then on. This is to prevent the units from inadvertently starting out in teach/learn mode, which is a vulnerable state to be in.

Establishing Control Relationships With the Teach/Learn Switch

To program a lightswitch to control another lightswitch or power outlet, a user uses the teach/learn switches on both modules. Suppose one wants the bedroom lightswitch to control a power outlet next to the bed; then he has to "teach" this lightswitch how to do it.

Step 1: The "student" lightswitch is put into "teach/learn mode" by turning on its teach/learn switch.

Step 2: The teach/learn switch is toggled on, then off on the "teacher" power outlet. This "teaches" the student lightswitch the identify of the power outlet.

Step 3: The student lightswitch is taken out of teach/learn mode by turning off its teach/learn switch.

The lightswitch can now control the power outlet which has been selected. The preceding example is called "one-to-one mapping". It is also possible to do "n-to-one mapping".

If a user wished to control the same outlet mentioned in the preceding example from a different lightswitch, without disturbing the fact that it is already controlled from a different lightswitch, he need only repeat the above steps with the new student lightswitch and the same outlet. Then both switches control the same outlet. A user can teach many other switches to control this same outlet.

It is also possible to do "one-to-n mapping", as follows. To teach a lightswitch how to control more than one outlet or lightswitch:

Step 1: The "student" lightswitch is put into "teach/learn mode" by turning on its teach/learn switch.

Step 2: The teach/learn switch is toggled on, then off on the "teacher" power outlet or lightswitch. This step is repeated for each outlet or lightswitch desired to be controlled. The student lightswitch will learn them all.

Step 3: The student lightswitch is taken out of teach/learn mode by turning off its teach/learn switch.

The student lightswitch then controls all of the power outlets and lightswitches that were selected.

"One-to-n" mapping described above creates groups. All of the outlets and lightswitches controlled by a single lightswitch are members of a group. Each device can simultaneously be a member of more than one group. There can be many groups, each group can include a different subset of the population, and groups may overlap.

For each module to be a member of one or more groups, and with reference to the preferred embodiment of the invention, there can be as many groups as determined by the capacity of the microprocessor employed. Each group has a numeric group code associated with it, as for example, an integer between 1 and 32. A single CEBus message may be addressed to an entire group code, which would be simultaneously received by all units that are a member of that group. Each group can have as many members as desired. At the beginning, all the groups are unused and have no members.

Referring again to FIGS. 5–7, when a user teaches a lightswitch to control several other modules, a sophisticated electronic conference takes place to form a new group. While in the teach/learn mode, the student lightswitch learns (21) the addresses of each of the modules that will be controlled. When the student module is taken out of teach/learn mode, it processes its accumulated list of CEBus addresses (22). It must assign each of the modules listed to this new group.

Before any modules can be assigned to a new group, an unused group code must be found to identify this new group. To do this, the student module hails (23) for an unused group code. This is analogous to hailing for an unused unit code or an unused house code. When it finds a group code for which no one responds to the hail, this group code is available for use to address the new group.

The student lightswitch then sends a message to each unit in its accumulated list, instructing that unit to join the new group 24. A unit joins a group by simply remembering the group code and reacting to messages to that group in the future. This does not interfere with that unit's membership in any previous groups. When all the units in the list have joined the new group, a new group exists. The group members are all the units that were taught to the student lightswitch while it was in learn mode. Subsequently, the student lightswitch can turn all those modules on or off simultaneously by sending out a message to that group code.

When one lightswitch "learns" to control another lightswitch which employs a mechanical on/off toggle as referred to in FIG. 2, (the on/off switch 7), the on/off state of its local relay might not coincide with its switch position if it has been controlled remotely. The present invention allows local control of the relay to be regained by the user by toggling the switch again. Another embodiment of the present invention could also employ a pushbutton momentary contact switch which would avoid the case in which a remotely controlled switches toggle switch could ever reflect the incorrect position. Other embodiments of the present invention could employ other switch means including, but not limited to, sensor devices, voice activation, computers or the like.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Appendices A and B attached hereto describe the software utilized in the system of the invention.

What is claimed is:

1. An electric utility network comprising:

a plurality of devices including outlets and switches for selectively controlling said outlets, each of said devices having plural activation states such as on and off;

all of said devices being electrically inter-connected, and each having means; for initially generating and remembering a unique unit identifying code upon occurrence of a certain event and declaring said unit identifying code to the other devices, and at least one of said devices having means for monitoring said unit identifying codes declared by at least one of said other devices, and at least one of said devices having means for changing its own activation state in response to certain unit codes corresponding to at least one of said other devices.

2. The invention of claim 1, wherein each of said devices comprises means for generating different house codes and for testing each house code generated for response from other homes, until a unique house code is found, and thereupon establishing the unique code as its house code.

3. The invention of claim 1, wherein each of said devices comprises means for enerating the established common house code in addition to its particular unit code, and means for discriminating between various house codes so as to prevent response to signals generated in other homes.

4. The invention of claim 3, wherein each of said devices comprises means for copying and adopting a house code from other of said devices in the same home.

5. The invention of claim 4, wherein each of said devices has a teach/learn mode and a normal mode, and contains means, active only in the teach/learn mode, for establishing a control relationship with one or more of the other said devices.

6. The invention of claim 5, wherein each device comprises means for rendering itself responsive, in its normal mode, to codes from other devices that it has heard in its teach/learn mode.

7. The invention of claim 5, wherein each device becomes and remains aware of the existence of other devices whose codes its hears while in its teach/learn mode.

8. The invention of claim 5, wherein each device comprises a manually operable auxiliary switch for placing the device in either its teach/learn mode or its normal mode.

9. The invention of claim 5, wherein each device comprises means for generating a group code common to all interrelated devices in the network.

10. The invention of claim 5, wherein each device can be reset to an unresponsive state.

11. A method of establishing control relationships between plural devices in a home electrical system, using existing home wiring, comprising providing each said device with means for generating and remembering a unique unit identifying code, means for declaring its code upon the occurrence of predetermined events to other devices on the home wiring, and means communicating with the home wiring for detecting unit identifying codes declared by other of said devices, and establishing control relationships between said devices, whereby activation of one of said devices will produce a response in any other of said devices with respect to which a controlling relationship has been established.

12. The invention of claim 11, wherein each of said devices assigns itself a unique code, comprising a house code and a unit code, if it does not already have one, by first listening for a house code declared by another unit in the same house, and then, if it hears no house code, generating and declaring a series of arbitrary house codes, and adopting as its house code the first of such codes to which it does not receive an acknowledgment from another house, and second generating and declaring a series of arbitrary unit codes, and adopting as its unit code the first of such codes to which it does not receive an acknowledgment from another unit.

13. The invention of claim 12, wherein each of said devices have an auxiliary teach/learn switch, and control relationships between devices are established, once each device has adopted its own unique code, by first placing a first of said devices in its teach/learn mode with the auxiliary switch, then toggling a second of said devices in and out of its teach/learn mode, whereupon said second device declares its unique code, said first device hears and remembers the code of the second device, and then placing the first device back in its normal mode, whereafter said first device controls said second device.

* * * * *